United States Patent [19]
Yokev et al.

[11] Patent Number: 5,335,246
[45] Date of Patent: Aug. 2, 1994

[54] PAGER WITH REVERSE PAGING FACILITY

[75] Inventors: Hanoch Yokev, Ramat Gan; Haim Harel, Herzliya, both of Israel

[73] Assignee: Nexus Telecommunication Systems, Ltd., Israel

[21] Appl. No.: 961,776

[22] Filed: Oct. 15, 1992

Related U.S. Application Data

[63] Continuation-in-part of Ser. No. 932,610, Aug. 20, 1992, abandoned.

[51] Int. Cl.⁵ .............................................. G08B 5/22
[52] U.S. Cl. .................................. 375/1; 340/825.44; 340/825.54; 340/825.47; 370/57; 370/58; 455/31.1
[58] Field of Search ................. 375/1; 379/57, 58, 56, 379/59, 60, 61, 62, 63; 340/825.44, 825.54, 825.47; 455/31

[56] References Cited

U.S. PATENT DOCUMENTS

| Re. 32,365 | 3/1987 | Sebestyen . |
| --- | --- | --- |
| 3,223,779 | 12/1965 | McFarlane . |
| 3,384,822 | 5/1968 | Miyagi . |
| 3,447,085 | 5/1969 | Haas et al. . |
| 3,493,866 | 2/1970 | Miller . |
| 3,706,933 | 12/1972 | Bidell et al. . |
| 3,824,468 | 7/1974 | Zegers et al. . |
| 3,972,042 | 7/1976 | Johnson . |
| 4,030,033 | 6/1977 | Bibl et al. . |
| 4,053,889 | 10/1977 | Johnson . |
| 4,079,378 | 3/1978 | Hulderman . |
| 4,114,155 | 9/1978 | Rash . |
| 4,152,702 | 5/1979 | Piesinger . |
| 4,156,877 | 5/1979 | Piesinger . |
| 4,188,629 | 2/1980 | Johnson . |
| 4,193,030 | 3/1980 | Rabow et al. ........................ 375/1 |
| 4,222,115 | 9/1980 | Cooper et al. . |
| 4,403,343 | 9/1983 | Hamada . |
| 4,447,907 | 5/1980 | Bjornholt . |
| 4,229,741 | 10/1980 | Groth . |
| 4,267,592 | 5/1981 | Craglow . |
| 4,309,703 | 1/1982 | Biahut . |

(List continued on next page.)

FOREIGN PATENT DOCUMENTS

| 85304115.0 | 1/1986 | European Pat. Off. . |
| --- | --- | --- |
| 0484918A2 | 5/1992 | European Pat. Off. . |
| WO92/04796 | 3/1992 | PCT Int'l Appl. . |
| WO92/11722 | 7/1992 | PCT Int'l Appl. . |
| WO92/12601 | 7/1992 | PCT Int'l Appl. . |
| WO92/17011 | 10/1992 | PCT Int'l Appl. . |
| WO92/17012 | 10/1992 | PCT Int'l Appl. . |
| WO92/03558 | 2/1993 | PCT Int'l Appl. . |

OTHER PUBLICATIONS

Revue Technique Thompson-CFS by J. Lautier, entitled *Reseau de radiocommunication numerique en Duplex Temporel* (¹), vol. 10, No. 3, dated Sep. 1978. (Exhibit A).
Proakis "Spread Spectrum Signals", Digital Communications, second edition; pp. 845–860.

*Primary Examiner*—David C. Cain
*Attorney, Agent, or Firm*—Daniel J. Kluth

[57] ABSTRACT

Position determining apparatus including at least one base station including a base transmitter which periodically transmits timing signals and a plurality of mobile remote units. Each remote unit includes a mobile receiver operative to receive timing signals transmitted by at least one base transmitter; synchronization circuitry receiving the timing signals and providing a spread-spectrum frequency-hopping sequence characteristic of the particular remote unit; a mobile transmitter producing a radiated frequency-hopped signal responsive to the frequency-hopping sequence and the timing signal; and a message generator operative to modify the radiated frequency-hopped signal to transmit a message to the at least one base station. least one base station.

20 Claims, 5 Drawing Sheets

U.S. PATENT DOCUMENTS

| | | |
|---|---|---|
| 4,479,227 | 10/1984 | Bjornholt . |
| 4,494,238 | 1/1985 | Groth, Jr. . |
| 4,545,059 | 10/1985 | Spinks, Jr. et al. . |
| 4,578,819 | 3/1986 | Shimizu . |
| 4,611,333 | 9/1986 | McCallister et al. . |
| 4,644,351 | 2/1987 | Zabarsky et al. . |
| 4,665,404 | 5/1987 | Christy et al. . |
| 4,694,466 | 9/1987 | Kadin ................................ 375/1 |
| 4,701,934 | 10/1987 | Jasper . |
| 4,740,792 | 4/1988 | Sagey et al. . |
| 4,750,036 | 6/1988 | Martinez . |
| 4,785,463 | 11/1988 | Jane . |
| 4,811,379 | 3/1989 | Grandfield . |
| 4,823,123 | 4/1989 | Siwiak . |
| 4,825,193 | 4/1989 | Siwiak et al. . |
| 4,866,732 | 9/1989 | Carey et al. . |
| 4,868,560 | 9/1989 | Oliwa et al. . |
| 4,875,038 | 10/1989 | Siwiak et al. . |
| 4,882,579 | 11/1989 | Siwiak . |
| 4,891,637 | 1/1990 | Siwiak et al. . |
| 4,928,177 | 5/1990 | Martinez . |
| 5,005,183 | 4/1991 | Carey et al. . |
| 5,017,926 | 5/1991 | Ames . |
| 5,063,560 | 11/1991 | Yerbury et al. . |
| 5,073,899 | 12/1991 | Collier et al. . |
| 5,073,900 | 12/1991 | Mallinckrodt . |
| 5,099,245 | 3/1992 | Sagey . |
| 5,103,459 | 4/1992 | Gilhousen et al. . |
| 5,105,435 | 4/1992 | Stilwell . |
| 5,111,478 | 5/1992 | Stilwell . |
| 5,142,279 | 8/1992 | Jasinski et al. . |
| 5,142,534 | 8/1992 | Simpson et al. . |
| 5,144,668 | 9/1992 | McDonald . |
| 5,148,452 | 9/1992 | Kennedy et al. . |
| 5,153,582 | 10/1992 | Davis . |
| 5,155,742 | 10/1992 | Ariyavisitakul et al. . |
| 5,164,958 | 11/1992 | Omura . |
| 5,191,593 | 3/1993 | McDonald et al. . |
| 5,193,101 | 3/1993 | McDonald et al. . |
| 5,193,102 | 3/1993 | Meidan et al. . |
| 5,204,876 | 4/1993 | Bruckert et al. . |
| 5,210,771 | 5/1993 | Schseffer et al. . |
| 5,212,831 | 5/1993 | Chuang et al. . |
| 5,222,101 | 6/1993 | Ariyavisitakul et al. . |
| 5,224,121 | 6/1993 | Schorman . |
| 5,226,045 | 7/1993 | Chuang . |
| 5,235,615 | 8/1993 | Omura . |
| 5,239,677 | 8/1993 | Jasinski . |
| 5,267,261 | 11/1993 | Blakeney, II et al. . |

PAGER WITH REVERSE PAGING FACILITY

RELATED APPLICATION

This application is a an continuation-in-part of Ser. No. 932,610 entitled "Remote Position Determination System" filed by the same applicants on Aug. 20, 1992, now abandoned.

FIELD OF THE INVENTION

This invention relates to the field personal pagers and in particular to the pagers having a reverse paging provision.

BACKGROUND OF THE INVENTION

Paging systems in which pocket sized remote units are carried by a individuals have become a ubiquitous feature of modern life. Such units allow for individuals to be paged from a base station and for the transmission of messages to the remote unit. Generally such messages are displayed on a low power display such as a liquid crystal display. Alternatively the message is transmitted to the remote units by voice. In response to the message, the individual generally communicates with the sender by telephone.

Position location systems are well known. In particular, systems for the location of ships based on triangulation of fixed or moving transmitters by the ship are well known. Furthermore, it is known to transmit a signal from a movable object and to find the position of the object by triangulation from fixed receivers or from a single moving receiver.

In the TRANSIT system, six polar transit satellites, whose instantaneous positions are well known, transmit a fixed tone. A receiver on a ship receives this signal and determines both the time at which the Doppler shift gradient is a maximum and the magnitude of the Doppler shift. From the time of shift and the known position of the satellite at that time, the latitude is determined. From the magnitude of the shift, the longitude can be determined.

In a variant of the TRANSIT system, called WARK, the ground based object, such as a ship, transmits the signal which is received, with its Doppler shift, by the satellite. The satellite rebroadcasts the signal to a ground station which computes the object's position and transmits it to the object.

Automatic personal locators (APL) and Automatic Vehicle Locators (AVL) are also known in the art. In general, these devices are relatively large and transmit substantial power or are small and have a limited range. If the system is small, attempts to increase its range will result in its batteries being consumed too quickly for the system to be practical.

Spread spectrum techniques and, in particular, frequency-hopping techniques for communication are also well known. See for example, *Digital Communications* by, John G. Proakis, McGraw Hill, NY pp. 845-860. In general, these systems have a bandwidth of several kilohertz, which is suitable for information transmission. In view of this requirement, such devices have either a large size or short range or both.

The use of a wide band receiver for the reception of narrow band, frequency-hopped signals is known in the art. In such systems, signals are received from one or more sources by a wide band receiver and the signals are processed by a fast Fourier transform to provide signals in the frequency domain. A computer divides this spectrum into relatively narrow preset communication channels, which correspond to the channels which are used by the transmitting stations. When a plurality of transmitting stations are used, the system is capable of separating between them and can thus receive more than one message, although the problem of de-interleaving of the signals becomes difficult when large numbers of potential or actual transmitters are involved.

Location systems for vehicles based on GPS or Loran-C are also known. In these systems a mobile receiver receives the GPS or Loran-C signals, determines its own position and broadcasts this position to a central station.

Two-way radio systems are also known. However, no pocket-sized system no system has been proposed which will provide the combination of low-power (for long battery life and small size) and wide area of response necessary for a paging system which can operate over a substantial area such as a city.

SUMMARY OF THE INVENTION

The present invention seeks to fill the need which exists for a paging system in which any one of a large number of remote pocket sized receivers (also referred to as "remote units") can be paged from a base station and in which the remote units can also page, and preferably send messages to, other remote units or to telephones specified by the paging remote unit (referred to herein as a "reverse-paging" provision).

Preferably, the system is also provided with the facility to determine the location of the remote unit when it is paged (or at other times) such that the remote unit can also be used to request assistance in emergency situations.

None of the prior art methods fully solves the problem of determining the position of large numbers of remote units over a large area and certainly none of the methods provides for a system which can provide for reverse paging.

In general, the present invention provides for a system of paging in which the remote unit has a small size and weight and an acceptable battery life. The present invention allows for a large number of remote units which can be independently paged and which can respond by sending any one of a number of messages to any telephone number specified by the carrier of the individual remote unit. In order to avoid the problems of battery drain in the remote unit, the amount of information transferred from the remote unit must be kept low, and to allow for a large number of remote units, and low power the transmission bandwidth must be narrow. Finally, it is desirable for the system to operate under spread-spectrum techniques and within the 1 watt power level allowed by FCC Regulation 15-247, which is incorporated herein by reference.

In general, such paging systems have large numbers of remote units which are only sporadically activated.

In the present invention, the system operates in a spread-spectrum mode using frequency-hopping in order to provide maximum range and minimum power. In addition to a large number of remote units, the system comprises one or a small number of base systems. The base system(s) comprises a very wide band receiver, which receives frequency-hopped signals from the remote units, and whose output signal is Fourier transformed and segmented into a very large number of narrow frequency channels. In order to accommodate a large number of users, these channels are very narrow, resulting in a very low noise for the system and thus a wide range, with low power for the portable remote units.

This type of system, by its very nature, transmits information very slowly; therefore, it is preferable that the information transmitted be precoded. Furthermore, since a delay of several seconds in receiving a message from the remote pager is generally acceptable, this time is available for sending simple messages on a very narrow-band system.

Therefore, in a preferred embodiment of the invention the base station includes a computer which stores a plurality of coded messages which can be chosen by the remote unit, and which the remote unit can then specify be sent to another remote unit or to a specified telephone number. This telephone may be either the telephone which has sent a message to the remote unit, or a number which is stored in the computer and retrieved by a code sent by the remote unit or to any other telephone number specified by the remote unit. In an alternative preferred embodiment of the invention, the reverse paging message is translated into a facsimile message which is sent to a remote facsimile machine.

In a preferred embodiment of the invention, the message can be sent as a synthesized voice message, a printed message, a displayed message for another pager or in any other form. Alternatively or additionally, an acknowledgement is sent by the remote unit to the base station (and preferably by the base station to the sender of the message) in response to activation of an acknowledgement code by the carrier of the remote unit. Preferably, the remote unit acknowledgement message includes the telephone number of the caller, so that the acknowledgement can be made by a separate system from the paging system. Alternatively, the same system is used for paging and acknowledgement.

When using the frequency-hopping spread-spectrum technique, the remote units must be accurately time locked with the base stations. In a preferred embodiment of the invention, synchronization signals are transmitted periodically from a central location and are received by the remote units. These periodic signals define a synchronizing time to the remote units and, preferably, an internal memory therein determines the correct frequencies for the frequency hopping transmission, so that they transmit at the correct frequencies at the correct times. Alternatively, the frequencies can be generated according to an algorithm stored in the remote unit.

Additionally, the base stations, if more than one are used in the system, must be accurately time locked.

The receivers have a greatly reduced de-interleaving problem, since the receivers in the base station will be able to identify each of the transmitters from its initial frequency or after a very few frequency hops.

It is not necessary that the remote units' radiators have very high frequency stability. In a preferred embodiment of the invention, ordinary crystal-controlled transmitters having an accuracy of one part in 100,000 ($\approx 10$ kHz) are sufficient, even though the frequency channels are made much narrower (of the order of 50 Hz or less) in order to allow for identification at large distances. The total band-width of the system is preferably of the order of 1.5 Mhz, which means that there are about 30 thousand available channels. However, to assure that there is minimal cross-talk or interference between adjacent transmitters or between different adjoining frequencies of the same transmitter (as described below), only about 3000 of these available channels are used. Broader or narrower total system bandwidth could also be used depending on the requirements of the particular application. Since only several remote units will be broadcasting at a particular time at or near the same frequency, one, or at most a few, frequency hops will be sufficient to determine which unit is transmitting, since the system need only search for a limited number of possible frequencies and combinations. The deviation of the remote units can then be determined. All subsequent received signals are corrected for the same, or a proportional, deviation.

In order to further aid in identification of the remote unit and the rejection of background noise, the frequency of the transmitter during a particular hop is preferably varied in a predetermined manner ("twiddling") which is recognized by the computer. Such twiddling may include a small repetitive frequency hop of, for example, about 450 Hz, i.e., about 9 channels, during the transmission at a given frequency-hopped frequency.

In one preferred embodiment of the invention the sequence of twiddled frequencies determines the information which is transmitted in that one of the frequencies represents a "zero" (0) and the other represents a "one" (1) in binary code. In a second preferred embodiment of the invention, transmission is in pulse form at a given pulse repetition rate; a "one" is represented by transmission at a given phase of the carrier and a "zero" by transmission at a carrier phase shift of 180 degrees from the given phase.

Position detection, if present, is preferably performed by using any appropriate method such as triangulation.

Triangulation direction finding is preferred and, in a preferred embodiment of the invention, it is based on an interferometric system. Position locating systems in which the position is determined by the time of arrival of signals requires a wide bandwidth. The present system uses a very narrow bandwidth to increase the number of channels and reduce noise. As is well known, the resolution of position determining systems is inversely proportional to the bandwidth of the system; since the bandwidth of the signals in the present system is very low, the system has essentially no range resolution based on time of arrival. The present system thus preferably uses an interferometric direction finding system which is as accurate as the time of arrival systems, but generally requires either a moving receiver or more than one receiver for locating the transmitter. For systems without position detection, only one base station is required.

By using these techniques, the system accommodates a large number of users and allows for synchronism of the spread spectrum/frequency hopping by the users.

There is, therefore, provided, in a preferred embodiment of the invention, paging apparatus including at least one base station including a base transmitter which periodically transmits timing signals; and a plurality of remote units including a mobile receiver operative to receive timing signals transmitted by at least one base transmitter; synchronization circuitry receiving the timing signals and providing a spread spectrum frequency-hopping sequence characteristic of the particular remote unit; a mobile transmitter producing a radiated frequency hopped signal responsive to the frequency-hopping sequence and the timing signal; and a message generator operative to modify the radiated frequency-hopped signal to transit a message to the at least one base station.

In a preferred embodiment of the invention the base station includes a base receiver which receives the radiated frequency hopped signal; and signal identification circuitry operative for identifying the remote unit based on the frequency sequence of received frequency-hopped signal.

Preferably, the base station also includes means for determining direction of the remote unit.

In a preferred embodiment of the invention, the remote unit includes means for providing an activating signal to activate the mobile transmitter in response to activation signals. The activation signal may be produced by a carrier of the remote unit or may be generated by the base station and received by the remote unit.

Preferably, the remote unit includes a frequency synthesizer which produces a frequency responsive to the resonant frequency of a resonant circuit. In a preferred embodiment of the invention, the resonant circuit includes a fixed, high-Q, element, preferably a crystal and a perturbating element which is periodically switched into the resonant circuit, whereby the resonant frequency is periodically switched.

Preferably, the perturbating element is a capacitor switched by a diode.

In a preferred embodiment of the invention, the message generator includes a frequency generator which generates a sequence of pulses each having one of two nearby frequencies in response to an input; and an encoder which chooses a particular pulse sequence responsive to an input by a carrier of the remote unit, whereby the particular sequence represents a message chosen by the carrier.

Preferably, the base station includes a decoder which receives and decodes the sequence; and a message dispatcher which dispatches the message to an intended destination.

There is further provided, in a preferred embodiment of the invention a reverse-paging transmission system including a plurality of portable remote units; and a base station operative to transmit messages to any one of the remote units, wherein the remote units are operative, when activated by a carrier of the remote unit, to transmit coded messages to the base station and the base station is operative to transmit the messages to a destination indicated by the portable unit.

BRIEF DESCRIPTION OF THE DRAWINGS

The invention will be better understood in conjunction with the following description of the non-limiting preferred embodiments of the invention which are described in conjunction with the drawings in which.

DETAILED DESCRIPTION OF THE PREFERRED EMBODIMENTS

Figure 1:
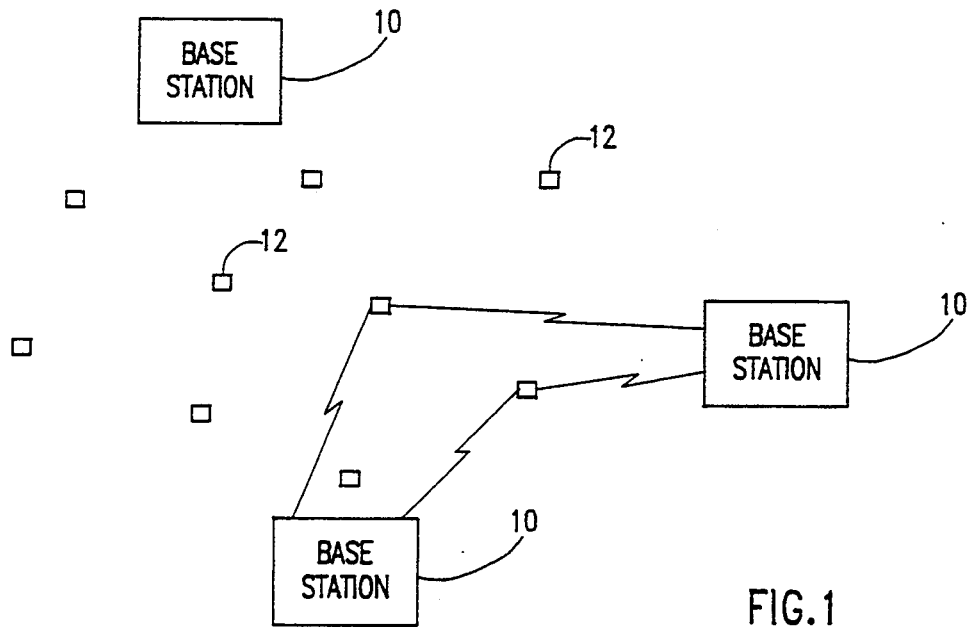
FIG. 1 is a schematic block diagram of a preferred embodiment of a paging/reverse-paging system in accordance with a preferred embodiment of the invention.

As shown in FIG. 1, a pager/reverse pager system, in accordance with a preferred embodiment of the invention, comprises one or more base systems 10 and a plurality, generally a large number, of mobile remote units 12, which can be carried by people or vehicles which are to be paged. In general, communication with a remote unit 12 is required only intermittently, and the remote unit is activated, as described below, only during such periods.

Figure 2A:
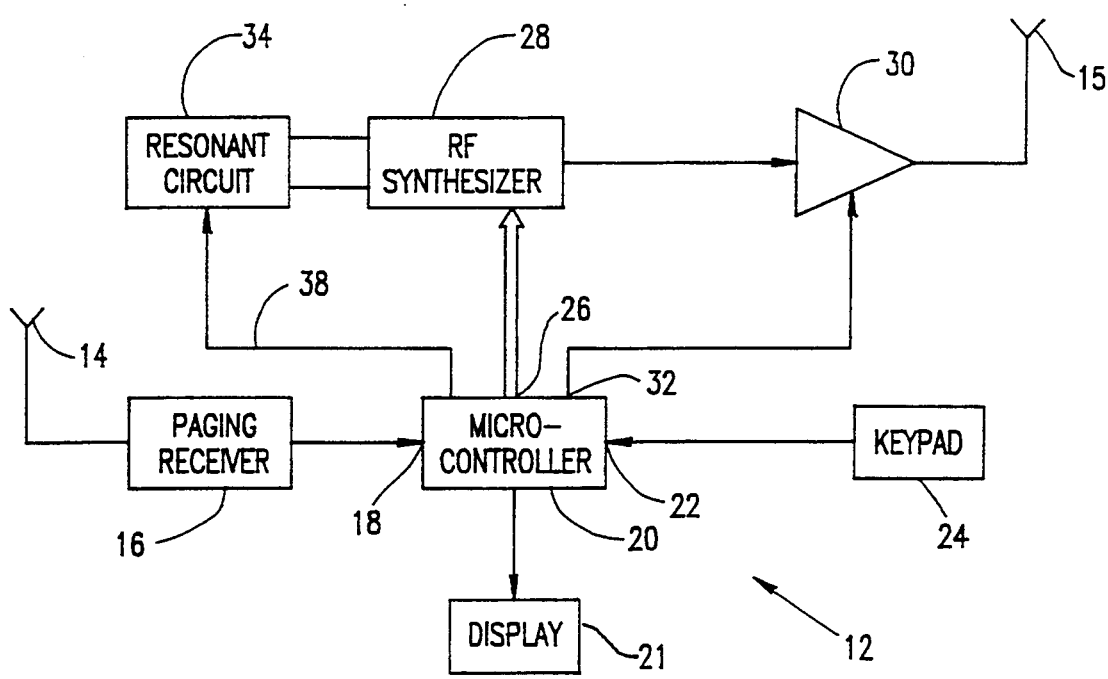
FIG. 2A is a schematic block diagram of a preferred embodiment of a remote unit in accordance with a preferred embodiment of the invention.

FIG. 2A shows the details of a single remote unit. Remote unit 12 comprises an antenna 14, for receiving signals from base system 10 and an antenna 15 for transmitting signals to the base system(s). Alternatively, the same antenna can be used for both sending and receiving signals from the base system. Antenna 14 feeds a paging receiver 16 which sends synchronization signals sent by base system 10 to an input port 18 of a microcontroller 20. Microcontroller 20 receives the signals from the receiver and resets an internal clock (not shown, but generally part of microcontroller 20) based on the time of arrival of the coded signals received by the remote unit. Microcontroller 20 also includes at least one look-up table which stores a frequency-hopping sequence (or algorithm for computing such sequence) which is characteristic of the particular remote unit.

Base system 10 also sends messages to the remote unit which are received by the antenna/microcontroller and are displayed on a display 21 which is preferably an LCD or other low-power display and which is preferably part of the pocket-sized remote unit (often referred to as a "pager"). Voice messages and other means of paging as are known in the art may also be used.

A second input port 22 receives "transmit" information from a keypad 24 which is also preferably an integral part of the pager and which is activated by a user. Alternatively, if the position of the remote unit is desired, a transmit (locate) command may be received from a base system via the pager receiver.

An output port 26 of microcontroller 20 supplies frequency control signals to an RF synthesizer 28 which drives antenna 15 via an amplifier 30. Amplifier 30 is preferably a C-class amplifier, producing up to 1 watt of power. Amplifier 30 is activated in response to signals received from a second output port 32 of microcontroller 20.

The nature of these signals will be described below.

Preferably, the frequency of transmission of remote unit 12 is determined by frequency synthesizer 28. The reference frequency for synthesizer 28 is provided by a crystal controller 34 which is typically a resonant circuit. Crystal controller 34 is attached to crystal input terminals of RF synthesizer 28, such that the output frequency of the RF synthesizer is the resonant frequency multiplied by a factor derived from the signal at port 26.

Figure 2B:
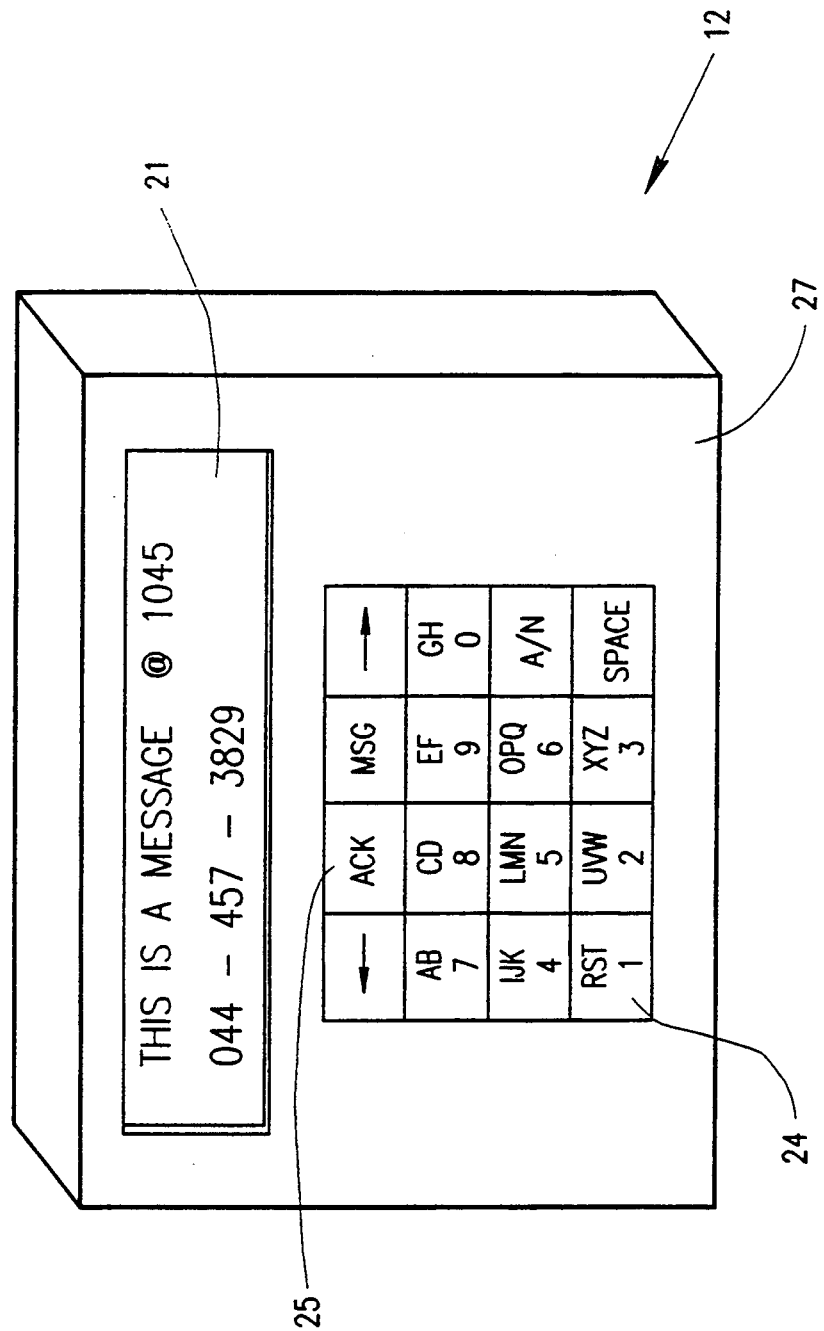
FIG. 2B is a view of the remote unit showing the display and the keypad.

FIG. 2B shows a preferred embodiment of a remote unit in accordance with the present invention. Display 21 is preferably a liquid crystal display or other low power display. Keypad 24 includes the capability of acknowledging receipt of a message by pressing a single acknowledgement key 25. The entire remote unit is packaged in a miniature case 27.

Figure 3:
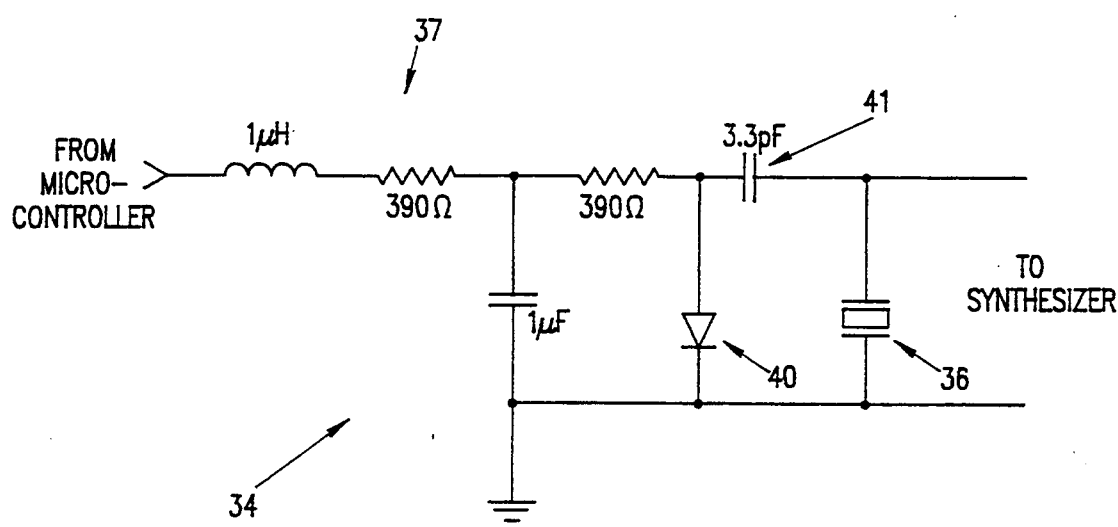
FIG. 3 is a schematic diagram of a crystal controller in accordance with a preferred embodiment of the invention.

A preferred embodiment of crystal controller 34 is shown in FIG. 3. Crystal controller 34 preferably includes a crystal 36, such as a high Q quartz crystal which oscillates at, for example, 9.6 Mhz, a switching circuit 37, which is activated from a third output port 38 of microcontroller 20, and a small perturbating capacitance which is connected in parallel to crystal 36 when switching circuit 36 is activated.

In the circuit of FIG. 3, when a diode 40 is back-biased, crystal 36 has the series combination of the diode capacitance and the 3.3 pf capacitance 41 across it. When the diode is forward biased, the capacitance across the crystal is 3.3 pf. The effect of the change of capacitance is to perturbate the effective frequency of the crystal by about one part in 50,000 and thus to twiddle the transmitted frequency by a like percentage.

If only the position of the remote unit is desired, then the signals which are broadcast by the remote unit will be a preset identification code, preferably, alternating frequencies of the twiddle.

In the message transmit mode, the carrier uses keypad 24 to key in a code which represents a message and a further code which represents the message destination. In a preferred embodiment of the invention, a series of messages, which may be tailored to the particular user, are each assigned a code, for example a three digit code. When the user wishes to send one of these messages, he activates his remote unit, types in the three digit code and a further code which indicates the destination of the message. This latter code could be a telephone number or may represent a particular remote unit. One such code would represent a command to send a return message to the sender of the last message.

Additionally, the user may type in a short message which is not stored in the base station together with a destination code. In this case the typed message will be sent.

In a practical situation, if the remote unit receives a message to go to a particular address, the carrier could acknowledge that he has received the message and is responding by typing in a code which represents the message "Message received, am responding" together with a code which directs that the message be forwarded to the sender of the original message. This message would be forwarded by the base station as described below.

Figure 4:
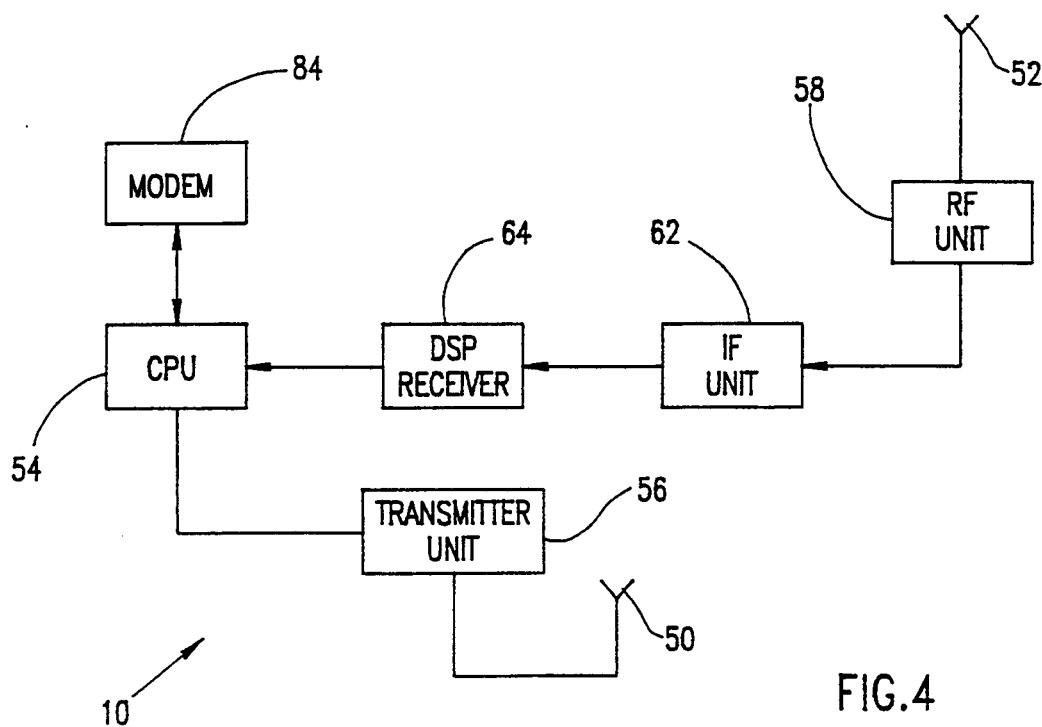
FIG. 4 is a schematic block diagram of a preferred embodiment of a base station in accordance with a preferred embodiment of the invention.
Figure 5:
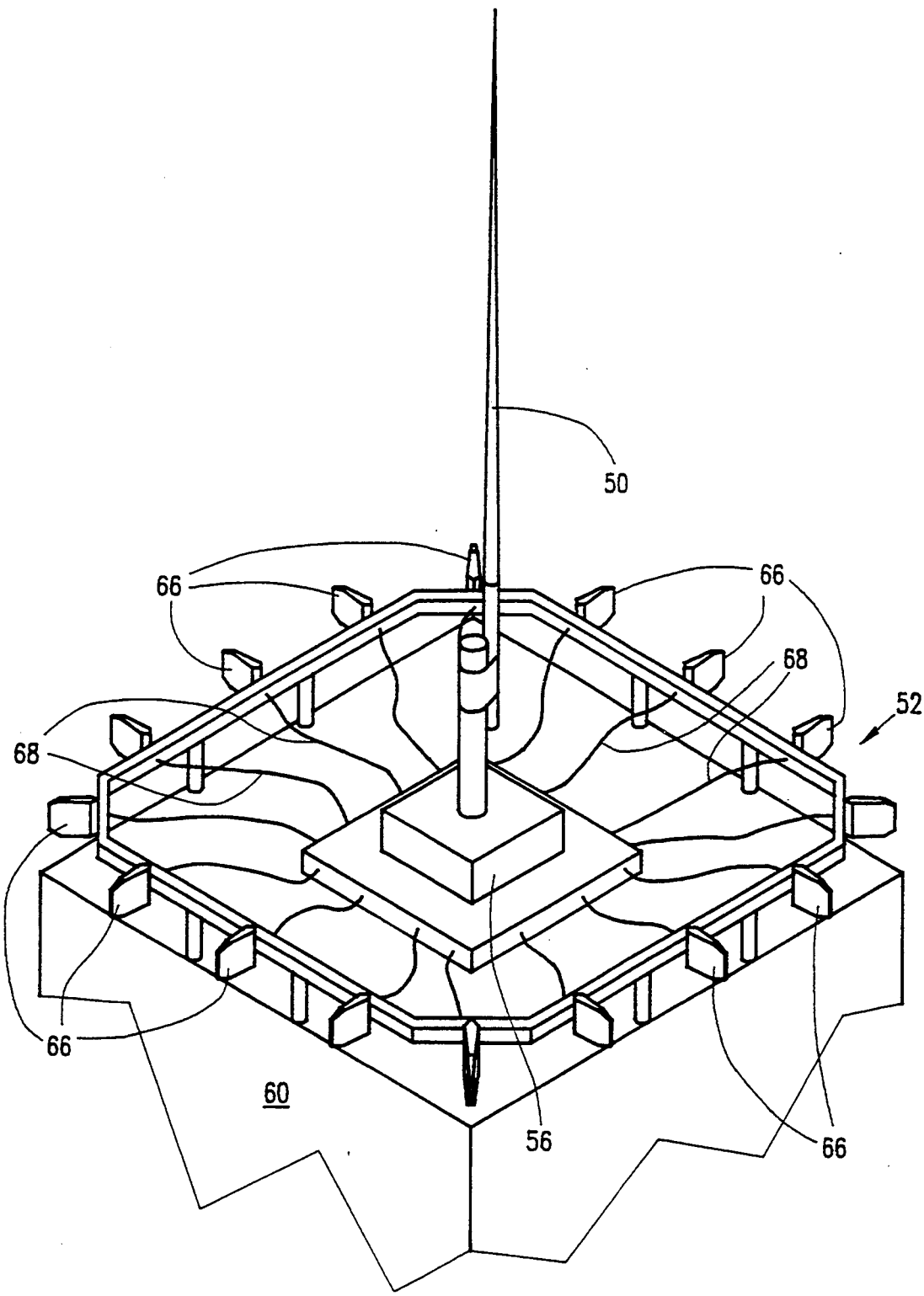
FIG. 5 is a drawing showing a preferred configuration of antennas used in the base station of the present invention and which is especially suitable for location of the remote units.
Figure 6:
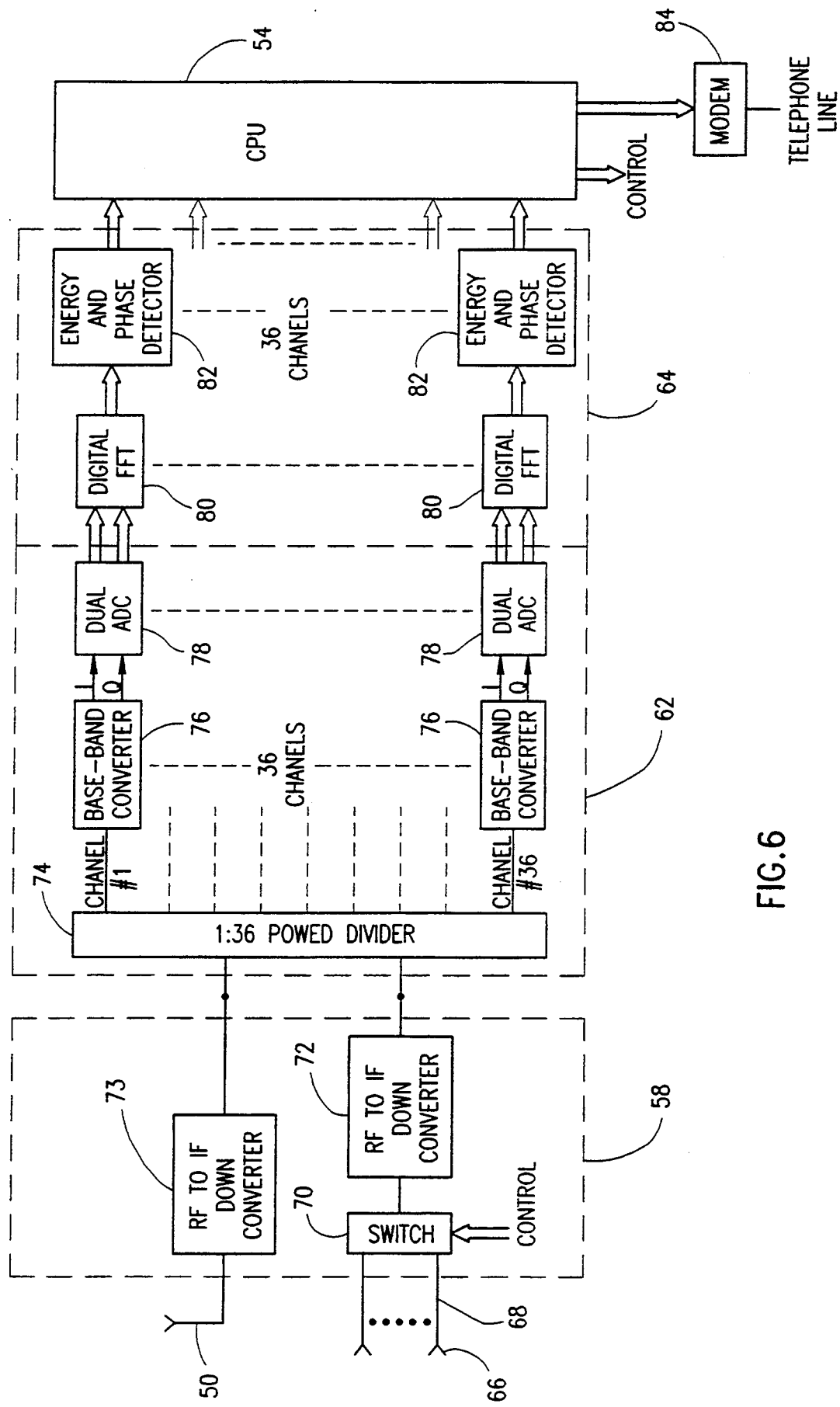
FIG. 6 is a more detailed block diagram of a portion of a preferred base receiver in accordance with a preferred embodiment of the invention.

FIGS. 4, 5 and 6 show the details of one base station. Base station 10 includes a CPU 54 which generates timing signals for synchronizing the remote units and which feeds these signals to a transmitter 56 for transmission to the remote units by transmitting antenna 50. Generally, antenna 50 is mounted together with a receiving antenna system 52 on a tower 60 or on the top of a tall building. While separate antennas are shown for receiving and transmitting, one shared antenna can be used, as is well known in the art.

In a preferred embodiment of the invention CPU 54 also activates the transmitter to transmit activation signals to one or more remote units when activation of these units is desired from the base unit, as for example when the location of the remote unit is to be determined.

Antenna 52 receives signals from remote units and passes these signals to RF unit 58, which down-converts the signals to IF band and passes them on IF unit 62. IF unit 62 provides base-band signals representative of the amplitude and phase of the received signals within a plurality of frequency bands. Digital Signal Processing (DSP) receiver 64 receives these signals and determines the frequency and phase of the signals received by the elements of antenna system 52. The frequency and phase information is fed into CPU 54 which then identifies the remote unit and determines its direction, if desired. More detailed operation of the receiver system is described in the following paragraphs with reference to FIGS. 5 and 6.

FIG. 5 shows a typical antenna system used for transmission and for the optional direction finding function of the system. Antenna 50 which transmits the signals to the remote units is typically a vertical dipole antenna array which radiates toward the horizon and toward the ground uniformly for all azimuthal angles. Antenna system 52 comprises a plurality of sets of three back-fire dipole antennas 66 which are not quite evenly spaced. In operation, each of the antennas 66, which face in the general direction of a remote unit, receives signals transmitted by the remote unit with different amplitude and phase. The phase information is used to determine the precise direction of the transmitting remote unit, however, there exists a phase ambiguity since antennas 66 are relatively widely spaced. The amplitude differences are therefore used to determine the general direction of the remote unit and eliminate this ambiguity. The spacing of antennas 66 is chosen to increase the phase sensitivity of the system without unduly increasing the ambiguity to the point where it cannot be resolved based on the amplitude differences.

The outputs of antennas are transmitted to RF unit 58 (shown on FIG. 6) by cables 68.

The outputs of antennas 66 are fed into a SPMT switch 70 which sequentially feeds the outputs into an RF to IF down-convertor 72. An input from antenna 50 is also down-converted in down-convertor 73 and provides a reference signal for the separate signals derived from antennas 66. The output of the two down-convertors is fed into a power divider 74 which produces a plurality of, typically thirty-six, substantially identical signals which are normalized for amplitude by the signal from antenna 50. Each of these thirty-six signals is base-band converted by base-band convertors 76 to produce a different segment of the frequency range converted to base band. For example, for an overall system bandwidth of 1.5 Mhz, the segments are typically 40 Khz wide and overlap to assure continuous coverage. The outputs of the base-band convertors are typically the in-phase and quadrature components of the IF signals. These components are digitized by a dual ADC 78 and the digitized signals are fed to a Digital FFT 80, typically having 1024 points, each of which represents one channel.

Depending on the number of remote units and other design factors, the overall bandwidth can be greater than 1.5 Mhz and the number of identical signals can be greater than thirty-six.

The individual spectra are then fed to energy and phase detectors 82, which determine the relative amplitude and phase of the signals at the individual antennas 66.

CPU 54 which receives these amplitude and phase signals also comprises a generator for generating the control signals for sequentially-switching switch 70. Thus computer 54 effectively sequentially receives the amplitude and phase of all signals which are received by each of antennas 66. Based on this information, a determination is made of the direction of the remote unit as described above.

CPU 54 also includes the frequency-hopping tables for all the remote units. Thus, when the computer receives a signal which is identified as belonging to one of the remote units, it determines which remote units belong to the group of remote units which would transmit at a frequency near the received frequency.

Clearly, if the frequency generator in the remote unit were perfect, then the CPU could determine immediately which remote unit is transmitting. However, since the accuracy of transmission of the remote units is only about 10 kHz, the CPU waits for a number of hops to determine a pattern of transmission. With this pattern in hand and the rough values of the frequency known, the system then determines which remote unit is actually transmitting and its deviation from the norm. This deviation will not change substantially over the short term and is used for the entire measurement.

Each base station also includes a modem for transmitting information to a central station. In particular, for position determination, one of the CPUs will generally act as a central station which will send timing signals to the other stations and receive direction information regarding the transmitting remote units from all the base stations. The central CPU will use this information to compute the position of the radiating remote unit, if desired.

Alternatively, a single mobile base station may be used which tracks the target while it moves, thus effecting the triangulation.

In the above explanation, the system both identifies and finds the direction of the remote system. In an alternate preferred embodiment of the invention, only identification and message transmission is required and the system can be simplified by using only a single base station, a simpler receiving antenna (i.e., only a single antenna and no switch 70) for the base station and omitting the energy and phase detection of the signals in the channels.

In the preferred embodiment of the invention having both a paging and a reverse-paging function, CPU 54 receives the signals which are transmitted by remote unit 12 and determines the codes which have been transmitted (as described above). It then sends the messages indicated by these codes to the desired destination via modem 84.

In a preferred embodiment of the invention, the message can be sent as a synthesized voice message, a printed message, a displayed message for another pager or in any other form.

Alternatively or additionally, an acknowledgement is sent by the remote unit to the base station (and preferably by the base station to the sender of the message) in response to activation of an acknowledge code by the carrier of the remote unit.

In an alternate preferred embodiment of the invention, the remote unit acknowledgement message includes the telephone number of the caller, so that the acknowledgement can be made by a separate computer system from the paging system.

Due to the extremely low bandwidth of the system, the information transmission rate is very low, nevertheless, a message code or several such codes and a telephone number can be transmitted within a few seconds. Since the major time factor involved is the sending of the message by CPU 54 over the telephone lines, this type of delay is hardly noticeable to the user.

The data transmission rate is about 50 baud. Each hop is active for approximately 180 msec and there is a dead time of about 10 msec between hops. At least 50 hops or 10 seconds is therefore required for the reverse paging messages.

In the preferred embodiment of the invention in which the frequencies transmitted by the remote units have been twiddled, the computer rejects any signals which are not associated with a "twin" at the correct frequency difference. This improves the rejection of the noise by the system and thus improves the range of detection of the remote units.

Use of twiddling also allows for a positive message transmission mode in which a pulsed signal is transmitted at a given pulse repetition rate by the remote unit at one of the two twiddled frequencies. The choice of which of the frequencies is to be transmitted would depend on the message, with one of the frequencies representing a one and the other a zero. This type of positive transmission mode in which a signal is always sent, greatly improves the reliability of the transmission.

In summary, a particular remote unit, when activated, transmits a frequency-hopped spread-spectrum signal. The exact frequencies used by the particular remote unit are stored in a memory associated with microcontroller 22 (FIG. 2) and the frequency transmitted at a particular time will depend on the identity of the remote unit and on the time of transmission.

In order to overcome the inherent inaccuracies in the timing circuits of the remote units, synchronizing signals are periodically transmitted by one of the base stations to all of the remote units. These timing signals reset the time base in the remote units so that it transmits using a frequency-hopping regime which is recognized by the base stations.

Since each remote unit has its own distinctive frequency hopping "fingerprint" which is stored both in microcontroller 20 of the remote unit and CPU 54 of base stations 10; when a remote unit transmits its fingerprint, the base station translates the received signal into a frequency value. Within a small number of frequency hops, the computer is able to identify the particular remote unit in spite of a frequency deviation in the transmission (or the receiver).

Alternatively or additionally, the synchronizing signals may also include a high frequency burst which is used by controller 20 to correct the base frequency generated by the remote unit's base crystal oscillator. In this case the number of hops required to identify the remote unit is substantially reduced, at the cost of a somewhat more complicated remote unit.

Preferably, the signals transmitted by the remote stations include coded messages and destination information which are uncoded by the base station which sends the messages to the desired destination.

Each base station may comprise antennas and circuitry which enable the CPU to determine the direction of the remote unit. Direction information from a plurality of base stations enables a central station to determine the position of the remote unit.

Additional variations of the invention will occur to a person versed in the art. The above preferred embodiment is not exclusive but is meant to be illustrative only. The scope of the invention is defined only by the claims which follow.

We claim:

1. Paging apparatus comprising:
   at least one base station including a base transmitter which periodically transmits timing signals; and
   a plurality of remote units, each including:
   a mobile receiver operative to receive timing signals transmitted by at least one base transmitter;
   synchronization circuitry receiving the timing signals and providing a spread spectrum frequency-hopping sequence characteristic of the particular remote unit;
   a mobile transmitter producing a radiated frequency-hopped signal responsive to the frequency-hopping sequence and the timing signal; and
   a message generator operative to modify the radiated frequency-hopped signal to transmit a message to at least one base station.

2. Apparatus according to claim 1 wherein the base station includes:
   a base receiver which receives the radiated frequency hopped signal; and
   signal identification circuitry operative for identifying the remote unit based on the frequency sequence of received frequency-hopped signal.

3. Apparatus according to claim 2 wherein the base station also includes means for determining direction of the remote unit.

4. Apparatus according to claim 1 wherein the remote unit includes means for providing an activating signal to activate the mobile transmitter in response to activation signals.

5. Apparatus according to claim 4 wherein the activation signal is produced by a carrier of the remote unit.

6. Apparatus according to claim 4 wherein the activation signal is transmitted by the bases station and received by the remote unit.

7. Apparatus according to claim 1 wherein the remote unit further comprises a frequency synthesizer which produces a frequency responsive to the resonant frequency of a resonant circuit.

8. Apparatus according to claim 7, wherein the resonant circuit includes a fixed high-Q element and a perturbating element which is periodically switched into the resonant circuit whereby the resonant frequency is periodically switched.

9. Apparatus according to claim 8 wherein the fixed high-Q element is a crystal.

10. Apparatus according to claim 9 wherein the perturbating element is a capacitor switched by a diode.

11. Apparatus according to claim 1 wherein the message generator comprises:
    a frequency generator which generates a sequence of pulses each having one of two nearby frequencies in response to an input; and
    an encoder which chooses a particular pulse sequence responsive to an input by a carrier of the remote unit, whereby the particular sequence represents a message chosen by the carrier.

12. Apparatus according to claim 11 wherein the base station comprises:
    a decoder which receives and decodes the sequence; and
    a message dispatcher which dispatches the message to an intended destination.

13. Apparatus according to claim 11 wherein the remote unit includes means for providing an activating signal to activate the mobile transmitter in response to activation signals.

14. Apparatus according to claim 13 wherein the activation signal is produced by a carrier of the remote unit.

15. Apparatus according to claim 13 wherein the activation signal is transmitted by the base station and received by the remote unit.

16. Apparatus according to claim 11 wherein the remote unit further comprises a frequency synthesizer which produces a frequency responsive to the resonant frequency of a resonant circuit.

17. Apparatus according to claim 16, wherein the resonant circuit includes a fixed high-Q element and a perturbating element which is periodically switched into the resonant circuit whereby the resonant frequency is periodically switched.

18. Apparatus according to claim 17 wherein the fixed high-Q element is a crystal.

19. Apparatus according to claim 18 wherein the perturbating element is a capacitor switched by a diode.

20. A reverse paging transmission system comprising:
    a plurality of portable remote units; and
    a base station operative to transmit a first message to any one of the remote units,
    wherein the remote unit is operative, when activated by a carrier of the remote unit, to transmit frequency-hopped spread spectrum signals containing second messages to the base station and the base station is operative to transmit the second messages to a destination indicated by the remote unit.

* * * * *